(12) United States Patent
Lohr

(10) Patent No.: US 6,450,374 B1
(45) Date of Patent: Sep. 17, 2002

(54) HIGH FLOW/LOW FLOW MIXING AND DISPENSING APPARATUS

(75) Inventor: James H. Lohr, Union Grove, WI (US)

(73) Assignee: JohnsonDiversey, Inc., Sturtevant, WI (US)

( * ) Notice: Subject to any disclaimer, the term of this patent is extended or adjusted under 35 U.S.C. 154(b) by 0 days.

(21) Appl. No.: 09/942,126

(22) Filed: Aug. 29, 2001

Related U.S. Application Data

(63) Continuation-in-part of application No. 09/716,883, filed on Nov. 20, 2000, now abandoned.

(51) Int. Cl.[7] .................................................. B67D 3/00
(52) U.S. Cl. ....................................................... 222/482
(58) Field of Search ............................. 222/129.2, 132, 222/144.5, 145.5, 145.6, 145.7, 527, 482; 251/209, 315.6; 137/625.46, 625.47

(56) References Cited

U.S. PATENT DOCUMENTS

| | | | | |
|---|---|---|---|---|
| 2,716,507 A | * | 8/1955 | Graves | .................... 222/129.2 |
| 3,132,428 A | * | 5/1964 | Haissig et al. | ............... 222/482 |
| 3,595,442 A | | 7/1971 | Shapiro | ....................... 222/133 |
| 4,732,328 A | | 3/1988 | Schydlo | ....................... 239/538 |
| 5,305,986 A | | 4/1994 | Hunt | ........................... 251/207 |
| 5,443,094 A | | 8/1995 | Olson et al. | ................. 137/892 |
| 5,505,382 A | | 4/1996 | Sealy et al. | .................. 239/316 |
| 5,937,890 A | * | 8/1999 | Marandi | ................... 251/315.6 |

* cited by examiner

*Primary Examiner*—Lesley D. Morris
*Assistant Examiner*—Thach H. Bui
(74) *Attorney, Agent, or Firm*—Neil E. Hamilton; Warren R. Bovee; Renee J. Rymarz

(57) ABSTRACT

Liquid mixing and dispensing apparatus which can dispense a high and a low flow rate by means of a flow control valve. The apparatus includes a multiplicity of containers with liquid concentrate which are interconnected with eductors so that when pressurized water flows through the eductors and by activation of a selected valve liquid concentrate is mixed with the water so as to dilute it for use. A flow control valve is positioned upstream of the selector valves and has a high and a low flow rate capacity. The high and low flow capacity is accomplished by metering devices placed in a ball of the valve or the valve housing.

17 Claims, 8 Drawing Sheets

HIGH FLOW/LOW FLOW MIXING AND DISPENSING APPARATUS

CROSS-REFERENCE TO RELATED APPLICATIONS

This is a Continuation-In-Part of application Ser. No. 09/716,883 filed Nov. 20, 2000, is now abandoned.

STATEMENT REGARDING FEDERALLY SPONSORED RESEARCH OR DEVELOPMENT: NONE

BACKGROUND OF THE INVENTION

1. Technical Field

This invention relates generally to liquid dispensing and more particularly, to combining and dispensing liquids in a time efficient manner.

2. Background Art

In the maintenance of large buildings such as office buildings or stores in shopping centers, it is customary to mix the required cleaning agents from a source of concentrate with water such as by employing an aspirator. The resulting solutions are then filled into suitable containers such as bottles or buckets. An apparatus of this type is available from Johnson Wax Professional of Sturtevant, Wis., as the Select AG. For chemical dispensing apparatus of this type, there are applications when a high flow rate (4 gpm or greater) is desired to deliver ready to use product, such as when filling a bucket or an auto-scrubber. However, a low flow rate (2 gpm or less) is desired when filling spray bottles. Current systems such as the Select AG dispensing apparatus and Quick Fill units available from Ecolab Inc. of St. Paul, Minn., are designed to fill either buckets or bottles from the same concentrate bottle through the dispenser but have a fixed, intermediate flow rate (i.e., 2.5 gpm). Other systems such as the Twist' n Fill available from the 3M Company and Outpost available from The Butcher Company, Inc. of Marlborough, Mass. can vary the flow rate, but they require two different concentrate bottles (high flow bottle/low flow bottle) of the same product to accomplish this function.

U.S. Pat. No. 5,443,094 and 5,505,382 both disclose dispensing systems with aspirators and valves in the liquid inlet lines.

In U.S. Pat. No. 5,305,986 there is disclosed a fluid control valve having two bores which allows for selective change of flow rate of fluid through the valve. The disclosed valve is designed for high temperature and pressure use.

The prior art does not provide a high and low flow rate dispensing apparatus which can deliver a high and low flow rate from a single concentrate source.

The objects of the invention therefore are:
a) Providing an improved liquid mixing and dispensing apparatus;
b) Providing a liquid mixing and dispensing apparatus which allows for different flow rates from the same product bottle;
c) Providing a liquid mixing and dispensing apparatus of the foregoing kind which can efficiently fill both large containers such as a bucket or an auto-scrubber and a small container such as a bottle;
d) Providing a liquid mixing and dispensing apparatus of the foregoing kind which can be easily retrofitted to a currently used dispensing apparatus;
e) Providing a liquid mixing and dispensing apparatus of the foregoing kind which allows for variation of the low flow rate.

SUMMARY OF THE INVENTION

The foregoing objects are accomplished and shortcomings of the prior art are overcome by the liquid mixing and dispensing apparatus of this invention which in one aspect includes a support member, at least one container placed on the support member, an eductor in fluid communication with the container, a valve member, a liquid intake conduit member connected to the valve member and the eductor, a flow control valve connected to the liquid intake conduit member, the control valve having a first bore constructed and arranged to provide a first flow rate and a second bore constructed and arranged to provide a second flow rate lower than the first flow rate, at least one of the bores includes a liquid metering device, a liquid product supply line operatively connected to the container and a liquid product intake of the eductor, a closure member connected to each container and the liquid supply line, and a liquid outlet line operatively connected to the eductor.

In a preferred embodiment, the second bore is smaller than the first bore.

In another preferred embodiment, the second bore includes the liquid metering device.

In another aspect, the second bore is adaptable to receiving at least two metering devices having different flow patterns.

In yet another aspect, a housing for the control valve has a passage with a liquid metering device positioned in the passage.

In still another aspect, a liquid metering device is positioned in both of the bores.

In still yet another aspect, the dispensing apparatus includes a multiplicity of containers, valve members and eductors.

These and still other objects and advantages of the invention will be apparent from the description which follows. In the detailed description below a preferred embodiment of the invention will be described in reference to the full scope of the invention. Rather, the invention may be employed in other embodiments.

DESCRIPTION OF THE PREFERRED EMBODIMENT

Figure 1:
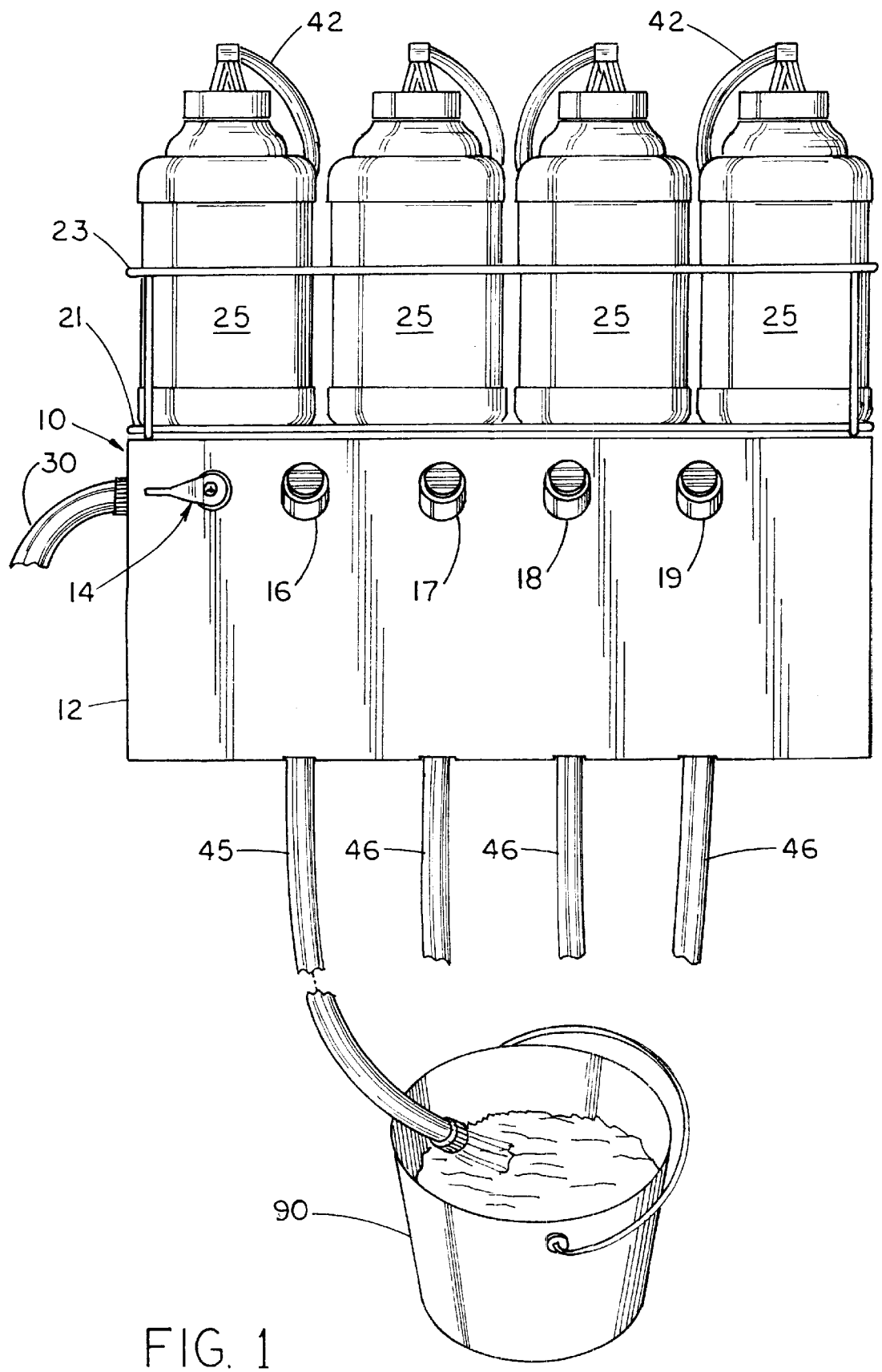
FIG. 1 is a view in elevation of the mixing and dispensing apparatus of this invention, illustrating the filling of a bucket.
Figure 2:
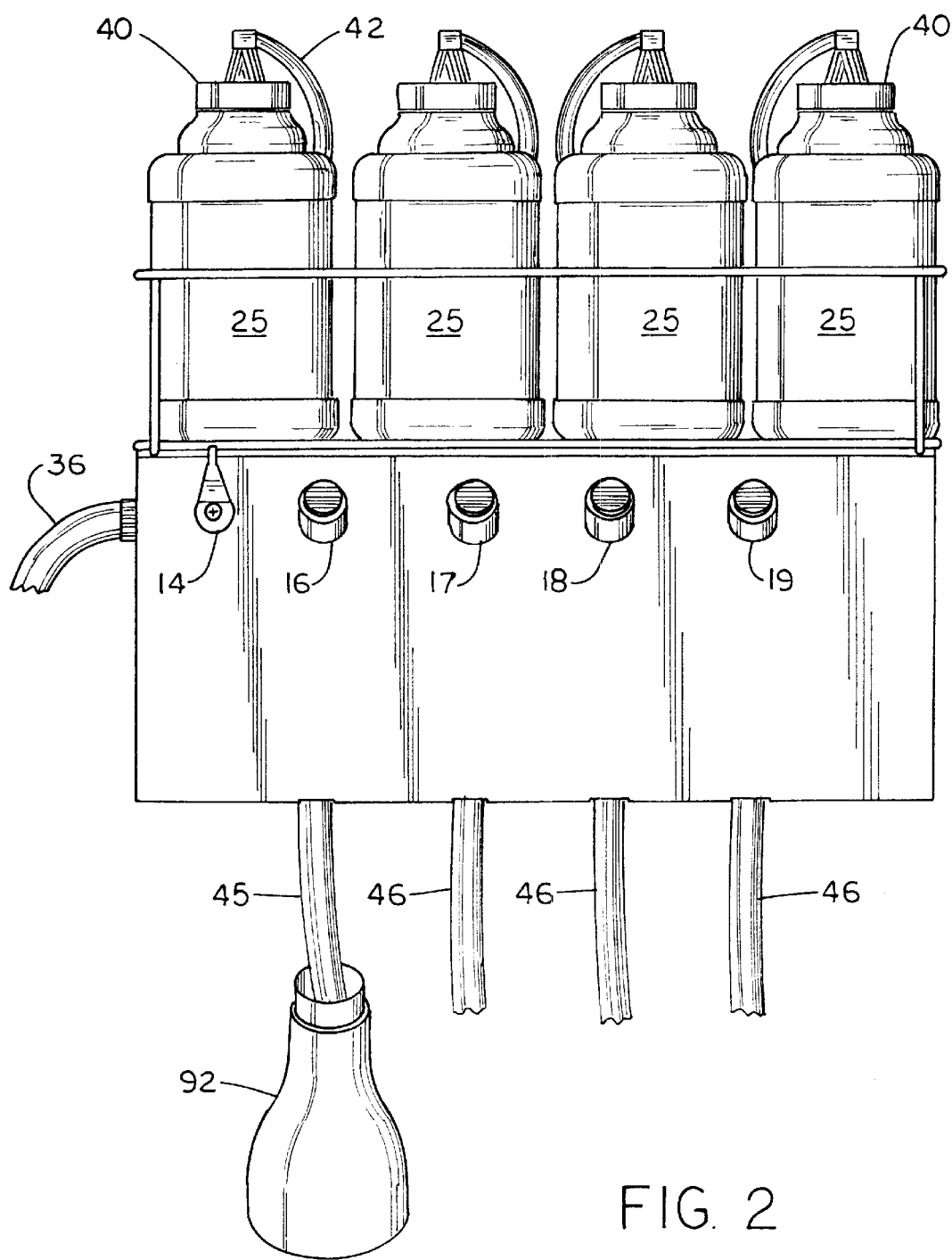
FIG. 2 is a view similar to FIG. 1 illustrating the filling of a bottle.
Figure 3:
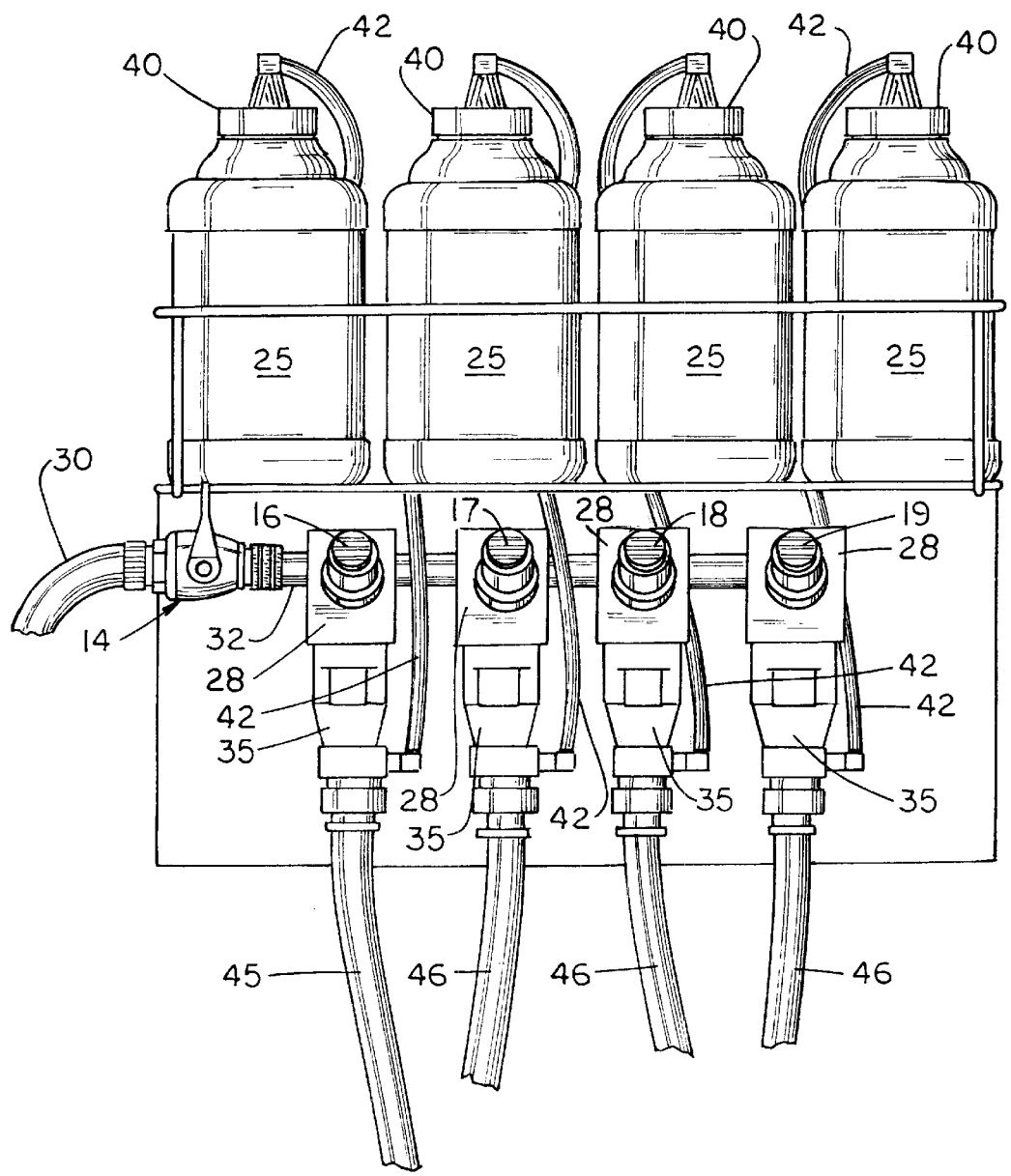
FIG. 3 is a view similar to FIG. 1 with a panel member removed.
Figure 4:
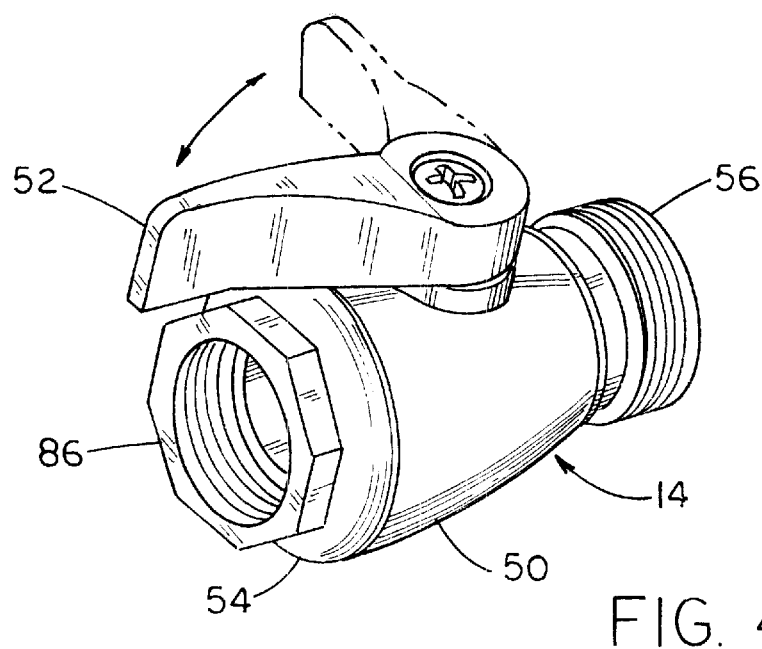
FIG. 4 is a perspective view of the flow control valve used in conjunction with the mixing and dispensing apparatus.
Figure 5:
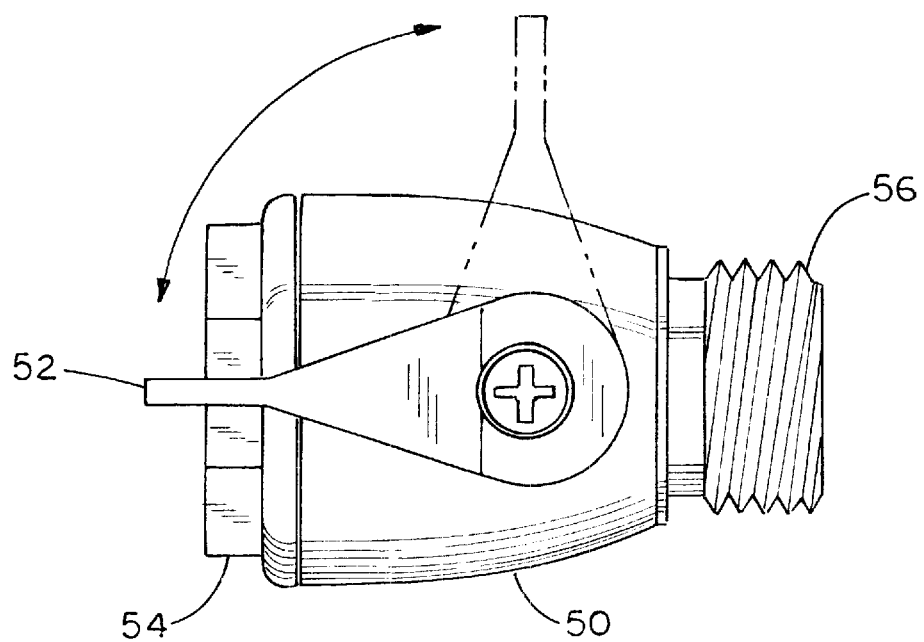
FIG. 5 is a top view of the control valve shown in FIG. 4 illustrating the positions of the handle member.
Figure 6:
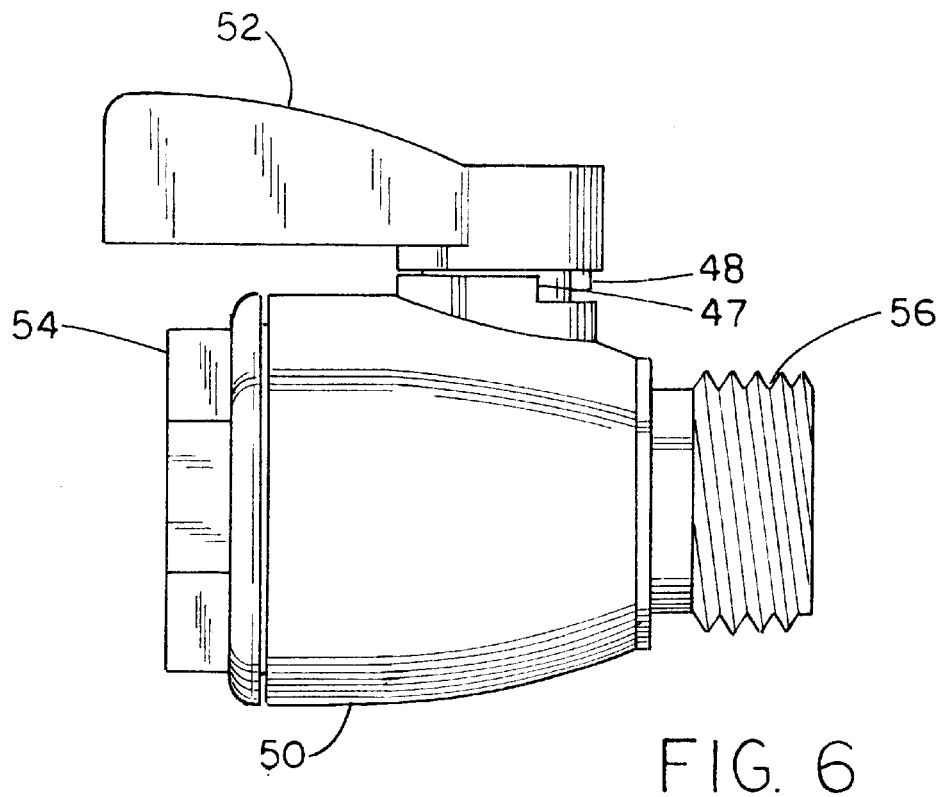
FIG. 6 is a view in side elevation of the flow control valve.

Referring to FIGS. 1–3, mixing and dispensing apparatus generally 10 includes a housing member 12 through which extends a flow control valve generally 14 and valve members 16, 17, 18 and 19. The housing member 12 includes an upper panel 21 which is connected to rack member 23 for confining containers 25 on panel 21. The containers 25 will contain a concentrated cleaning or sanitizing material. The valve bodies 28 are connected to manifold 32 which is connected to one end of the control valve 14. Water supply line 30 is connected to the other end of the control valve 14.

As seen in FIG. 3, eductors 35 are connected to the valve members 16–19. Positioned on containers 25 are caps 40. Liquid supply lines 42 are in fluid communication with the caps 40 and containers 25 at one end and with the eductors 35 at another end. Outlet lines 45 and 46 extend from the eductors 35. Eductors 38 are available from S.C. Johnson Commercial Markets, Inc., Sturtevant, Wis.

Referring to FIGS. 4–9, there is shown the flow control valve 14. It has a housing 50 to which is connected the handle 52. End cap 54 is threadably connected to the housing at one end such as by the threads 53. At the opposing end, there is a threaded portion 56 for connection to the manifold 32 (See FIG. 3). A valve seat 58 is positioned between the cap 54 and inside the hollow housing 50. A second seat 74 is positioned in the housing downstream of seat 58. These valve seats provide sealing engagement with the ball 65. Stop surfaces are provided at 47 and 48 to provide limited travel of handle 52 and orientation of ball 65.

Figure 8:
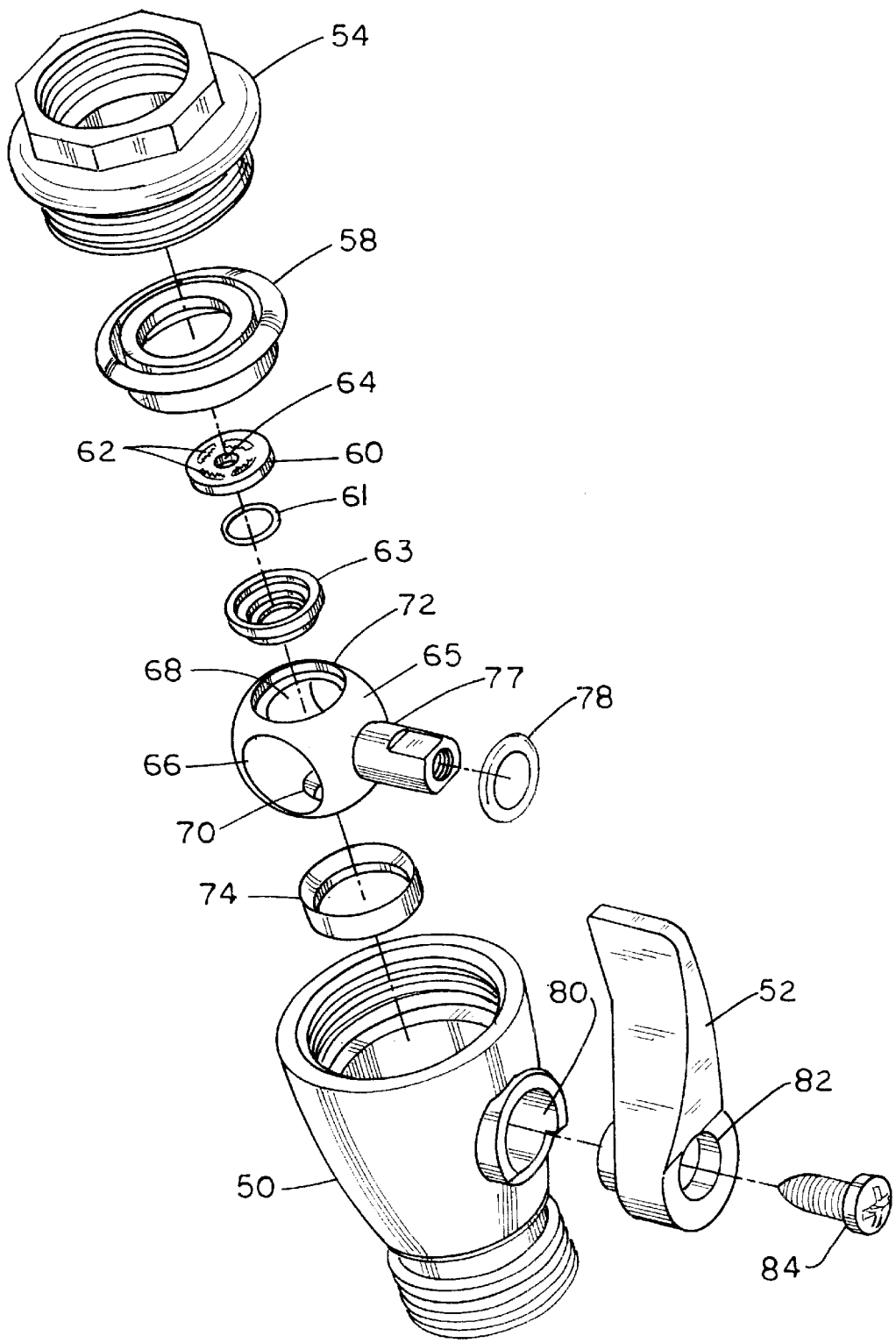
FIG. 8 is an exploded view of the flow control valve.

Referring specifically to FIG. 8, ball 65 has a main throughbore 66. In addition, there are two smaller bores 68 and 70 which extend transversely with respect to bore 66 and at a right angle to the axis of main bore 66. At the entrance to bore 68 is seat 72 which receives metering housing 63 in which is placed a washer 61. A metering device 60 has multiple apertures 62 and is positioned in the metering housing 63 with the washer 61. As illustrated, additional metering devices such as 64 with different apertures 67 for a different flow can be placed in seat 72 of bore 68.

Figure 7:
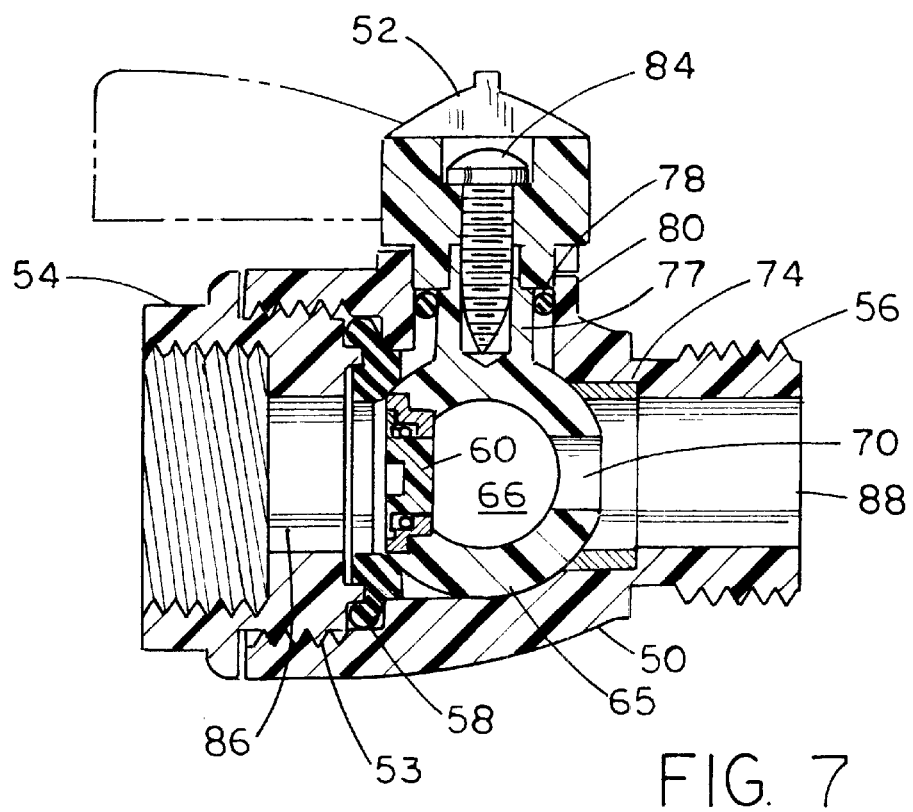
FIG. 7 is a view similar to FIG. 6 with the component parts shown in section.

As seen in FIGS. 7 and 8, valve housing 50 has a passage 80 which receives the valve stem 77 connected to the ball 65. Handle 52 is connected to the threaded stem 77 by means of the screw 84 extending through the opening 82 of the handle 52. The washer 78 provides the usual seal.

Figure 10:
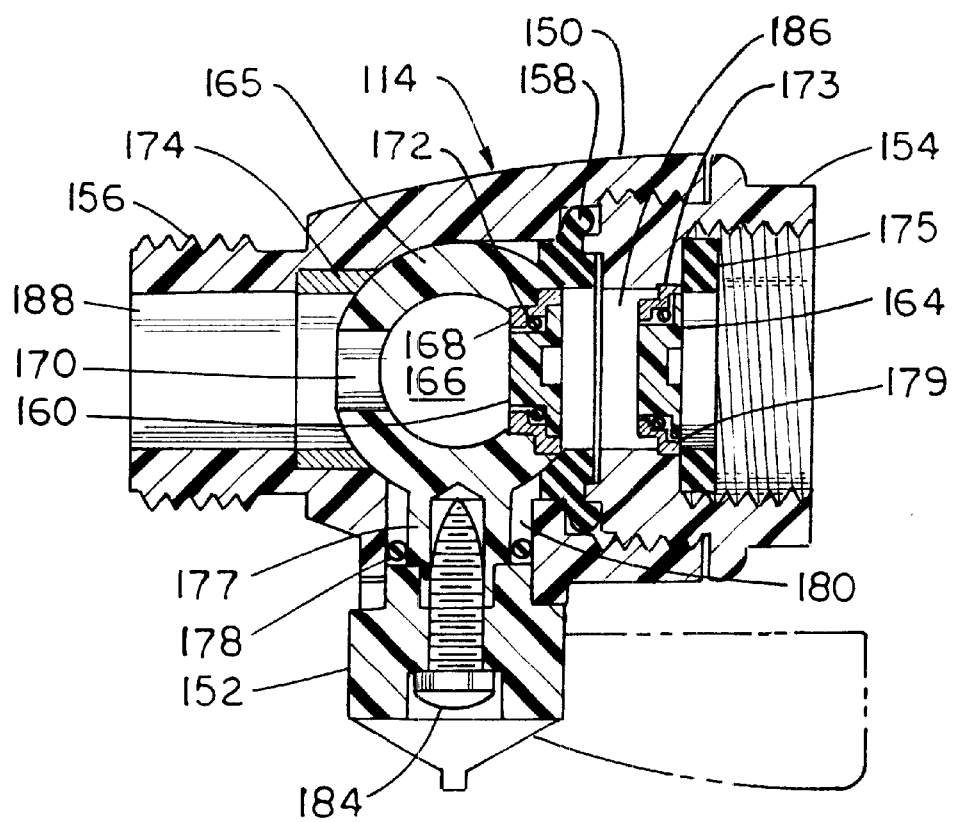
FIG. 10 is a view similar to FIG. 7 showing an alternative embodiment.
Figure 11:
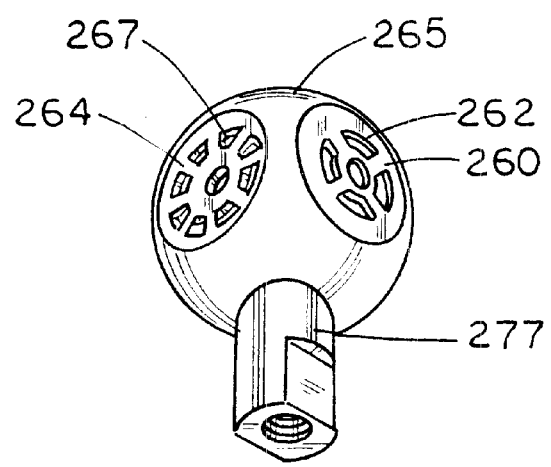
FIG. 11 is a perspective view of an alternative embodiment of a ball valve for use in the flow control valve.

FIGS. 10 and 11 illustrate alternative embodiments of a flow control valve 114 and a ball 265. Similar parts are designated with similar numbers except in the "100" and "200" series. Referring to FIG. 10, flow control valve 114 differs from valve 14 in the placement of a metering device 164 in the passage 186 of end cap housing 154. It is secured therein by washer 175 and has a peripheral flange 179 for seating against seat 173. The second metering device 160 would be placed in the smaller bore 168.

FIG. 11 shows ball 265 with two metering devices 260 and 264. One of the devices is placed in small bore 68 and the other in the larger bore 66 as seen in FIG. 8. In this instance, bore 66 would have the seat such as 72 to receive the device.

OPERATION

Referring to FIGS. 1–3, the dispensing of liquid material from dispensing apparatus 10 is effected in the usual manner. Water under pressure will be introduced through the supply line 30 and into manifold 32. Depending upon the material which is desired to be dispensed from containers 25, one of the valve members 16, 17, 18 or 19 will be activated. This causes water under pressure to flow through the corresponding eductor 35 which will cause a siphoning effect in the liquid supply line 42. This draws the concentrated chemical material into the diluent water and causes a mixed product to flow out of the outlet lines 45 or 46.

An important feature of the invention is the ability to have a high and low flow water mixing and dispensing apparatus 10 with high and low flow accomplished by the control valve 14. Referring to FIG. 7, when the bore 66 is aligned with the passages 86 and 88 a high flow condition is accomplished with the result that water flows through the eductors 38 at a rate of 4 gpm or greater which in turn causes the liquid concentrate to be mixed at a high rate with the diluent water. This is the condition which would be utilized to fill the bucket 90 as shown in FIG. 1. When a lower flow rate is to be accomplished, handle 52 would be turned 90 degrees as indicated in solid lines in FIG. 7. This would cause the metering device 60 to be orientated with the passages 86 and 88 to thereby reduce the flow of water through the ball 65 of valve 14. Note that for this purpose bore 70 is smaller than the bore 68 which receives the metering device 60. This position is the low flow rate having a flow rate of 2 gpm which is utilized to fill the bottle 92 as shown in FIG. 2.

Flow control valve 114 operates in essentially the same manner as valve 14. It offers the advantage of two metering devices 160 and 164 with different flow capacities with only a single device being placed in the ball 165.

Ball 265 can be substituted for ball 65 and operate as previously described for ball 65. It offers the advantage of two metering devices 260 and 264 with different capacities in a single ball.

Figure 9:
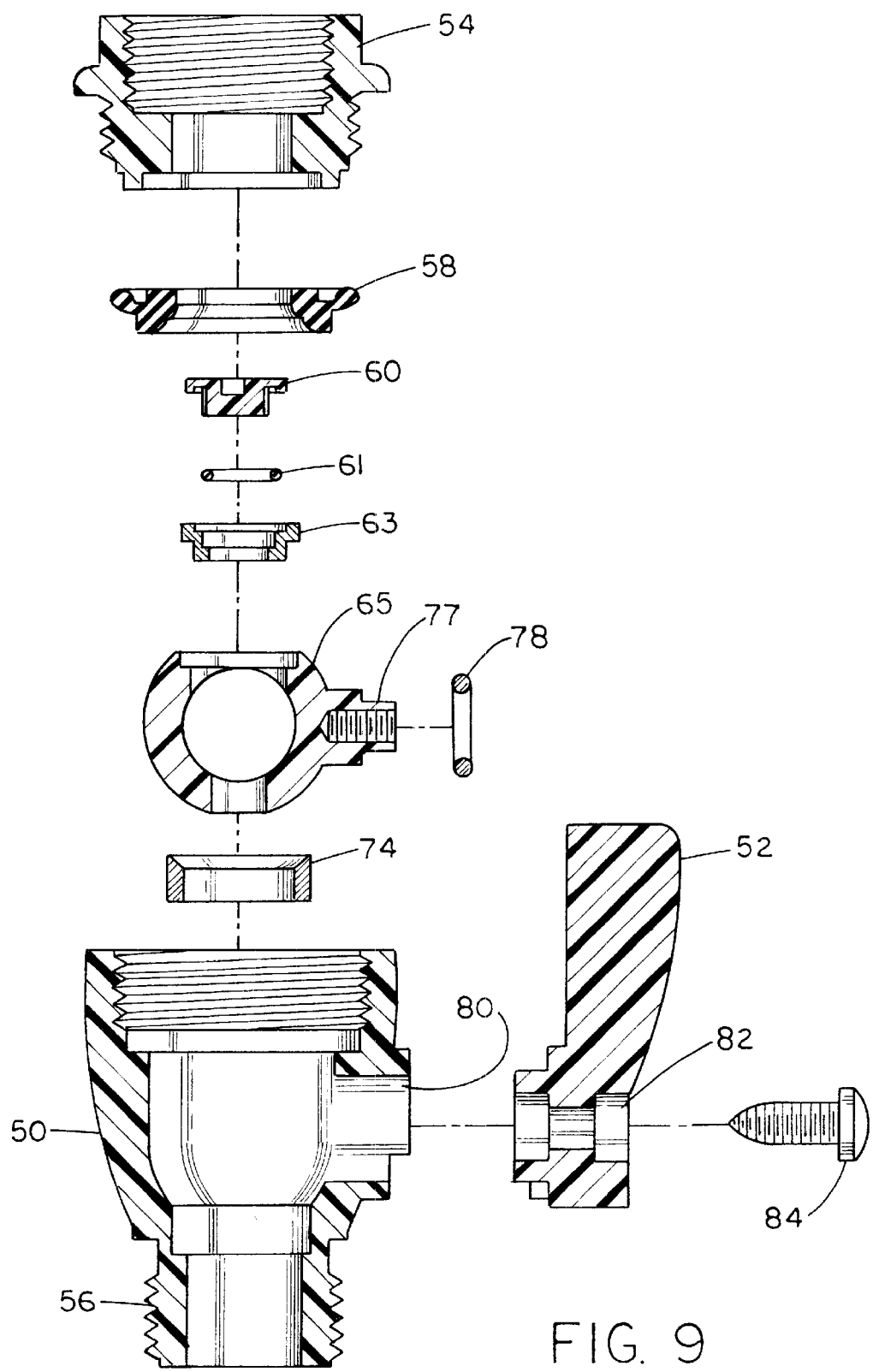
FIG. 9 is a view similar to FIG. 8 except showing the component parts in section.

It should be pointed out that for illustration purposes only, the handles 52 shown in FIGS. 8 and 9 are not in proper orientation with respect to the ball valve. Referring to FIGS. 4, 5, 6 and 7, when the handle 52 is parallel with the passages 86 and 88 a high flow condition is effected and when it is turned 90 degrees a low flow condition.

It will thus be seen that there is now provided a dispensing apparatus which can accomplish a high and low flow rate to fill either buckets or bottles from the same concentrate dispenser. This is accomplished while using only a single concentrate bottle.

While the dispensing apparatus has been shown in conjunction with a flow control valve having a metering device with specific configurations of apertures, it should be appreciated that other metering devices can be employed with various configurations of apertures or flow patterns depending on the desired flow rate. These can be easily inserted and removed from the ball 65 and valve seat 58. Semi-rigid containers 25 are described as being positioned on panel 21. Flexible bags could be substituted. Neither is it necessary that the containers or bags be placed on an elevated support member. They could be supported on a floor. Further, the liquid control valve 14 is operable with a portable dispensing apparatus wherein the housing member 12 and only a single valve body 28, manifold 32 and eductor 35 would be present in a portable housing. The outlet line 45 is described for filling a bucket 90 or a bottle 92. This line is in the form of a hose and can be used to broadcast a spray for cleaning purposes as well as for the purpose of filling a sink. Other variations and modifications of this invention will be obvious to those skilled in this art. This invention is not to be limited except as set forth in the following claims.

What is claimed is:

1. A liquid mixing and dispensing apparatus comprising:

a support member;

at least one container placed on the support member;

a valve member;

an eductor in fluid communication with the container;

a liquid intake conduit member connected to the valve member and the eductor;

a flow control valve connected to the liquid intake conduit member, the control valve having a first bore constructed and arranged to provide a first flow rate and a second bore constructed and arranged to provide a second flow rate lower than the first flow rate, at least one of the bores including a liquid metering device;

a liquid product supply line operatively connected to the container and a liquid product intake of the eductor;

a closure member connected to each container and the liquid supply line; and a liquid outlet line operatively connected to the eductor.

2. The liquid mixing and dispensing apparatus as defined in claim 1, wherein the second bore is smaller than the first bore.

3. The liquid mixing and dispensing apparatus as defined in claim 2, wherein the second bore includes the liquid metering device.

4. The liquid mixing and dispensing apparatus as defined in claim 3, wherein the second bore is adaptable to receiving at least two metering devices having different flow patterns.

5. The liquid mixing and dispensing apparatus as defined in claim 1, including a multiplicity of containers, valve members and eductors.

6. The liquid mixing and dispensing apparatus as defined in claim 1, wherein the first and second bores include liquid metering devices.

7. In a liquid mixing and dispensing apparatus having a support member, at least one container placed on the support member, an eductor in fluid communication with the container, a valve member, a liquid intake conduit member connected to the valve member and the eductor, a closure member connected to each container, a liquid supply line connected to the container and a liquid product intake of the eductor, and a liquid outlet line operatively connected to the eductor, the improvement comprising:

a flow control valve connected to the liquid intake conduit member, the control valve having a first bore constructed and arranged to provide a first flow rate and a second bore constructed and arranged to provide a second flow rate lower than the first flow rate, at least one of the bores including a liquid metering device.

8. The liquid mixing and dispensing apparatus as defined in claim 7 wherein the second bore is smaller than the first bore.

9. The liquid mixing and dispensing apparatus as defined in claim 7 wherein the second bore includes the liquid metering device.

10. The liquid mixing and dispensing apparatus as defined in claim 9 wherein the second bore is adaptable to receiving at least two metering devices having different flow patterns.

11. The liquid mixing and dispensing apparatus as defined in claim 7, including a multiplicity of containers, valve members and eductors.

12. The liquid mixing and dispensing apparatus as defined in claim 7 wherein the first and second bores include liquid metering devices.

13. A liquid mixing an dispensing apparatus comprising:

a support member;

at least one container placed on the support member;

a valve member;

an eductor in fluid communication with the container;

a liquid intake conduit member connected to the valve member and the eductor;

a flow control valve connected to the liquid intake conduit member, the control valve having a first bore constructed and arranged to provide a first flow rate and a second bore constructed and arranged to provide a second flow rate lower than the first flow rate, at least one of the bores including a liquid metering device, the flow control valve including a housing with a passage, a liquid metering device positioned in the housing passage;

a liquid product supply line operatively connected to the container and a liquid product intake of the eductor;

a closure member connected to each container and the liquid supply line; and a liquid outlet line operatively connected to the eductor.

14. The liquid mixing and dispensing apparatus as defined in claim 13, wherein the second bore is smaller than the first bore.

15. The liquid mixing and dispensing apparatus as defined in claim 13, wherein the second bore includes the liquid metering device.

16. The liquid mixing and dispensing apparatus as defined in claim 15 wherein the second bore is adaptable to receiving at least two metering devices having different flow patterns.

17. The liquid mixing and dispensing apparatus as defined in claim 13, including a multiplicity of containers, valve members and eductors.

* * * * *